United States Patent Office 3,661,831
Patented May 9, 1972

3,661,831
TETRAFLUOROETHYLENE/HEXAFLUOROPRO-
PYLENE COPOLYMER PARTICLES DISPERSED
IN ORGANIC LIQUIDS
James C. Fang, Media, Pa., assignor to E. I. du Pont
de Nemours and Company, Wilmington, Del.
No Drawing. Continuation-in-part of applications Ser. No.
413,333, Nov. 23, 1964, Ser. No. 528,047, Feb. 17,
1966, Ser. No. 654,333, July 19, 1967, and Ser. Nos.
738,817 and 738,818, both June 21, 1968. This application July 1, 1970, Ser. No. 51,722
Int. Cl. C08f 45/28, 45/34, 47/20
U.S. Cl. 260—32.8 A                32 Claims

ABSTRACT OF THE DISCLOSURE

Dispersions of tetrafluoroethylene/hexafluoropropylene copolymers in organic liquids, containing other film-forming materials, and articles coated with these dispersions.

CROSS-REFERENCES TO RELATED APPLICATIONS

This application is a continuation-in-part of applications Ser. No. 654,333, filed July 19, 1967; 528,047, filed Feb. 17, 1966; 413,333, filed Nov. 23, 1964, Ser. No. 738,817 and 738,818, both filed June 21, 1968, all now abandoned.

BACKGROUND OF THE INVENTION

This invention relates to dispersions of tetrafluoroethylene/hexafluoropropylene (TFE/HFP) copolymers. It is more particularly directed to stable, substantially anhydrous dispersions of TFE/HFP copolymers in organic liquids, to blends of these dispersions with other film-forming materials, and to articles coated with films of these dispersions.

Aqueous dispersions of TFE/HFP copolymers have been known for some time and have been extensively used to coat and impregnate articles with these polymers. These aqueous dispersions, however, have a tendency to coagulate irreversibly when subjected to excessive heat, freezing, mechanical agitation, or on the addition of electrolytes or water soluble solvents. They are also difficult to bond firmly to metal substrates without expensive and bothersome pretreatments.

In an attempt to prepare compositions without these shortcomings, dispersions of these copolymers have been prepared in organic liquids. These dispersions, however, have been unsatisfactory because they coagulate undesirably and settle quickly. This makes them unsuitable for commercial use.

The dispersions of this invention have none of these shortcomings. They are remarkably stable to coagulation, resist settling, and moreover, permit firm bonding of coatings to metal substrates without the pretreatment required when aqueous dispersions are used.

SUMMARY OF THE INVENTION

The copolymers used in the dispersions of the invention are the TFE/HFP copolymers. This designation takes in a whole family of TFE/HFP copolymers in TFE/HFP weight ratios of from 5–95/5–95. The preferred copolymers, because of the stability of the dispersions formed with them, are the 50–95/5–50 TFE/HFP copolymers. Even more preferred are the 75–95/5–25 TFE/HFP copolymers. Most preferred are the 93–95/5–7, the 84–88/12–16 and the 75–80/20–25 copolymers, specifically the 95/5, 85/15 and 75/25 copolymers. The 1–5/95–99 copolymers can also be used, as can those whose TFE/HFP monomer ratios range from 95–100/0–5.

Methods for preparing such copolymers are described in U.S. Pat. 2,946,763 to M. I. Bro, et al.

The TFE/HFP copolymers used should have molecular weights of at least about 20,000 to obtain the beneficial effects of the invention, for materials with molecular weights of less than this tend to be waxy and unsuited for preparing dispersions in organic liquids.

Preparation of the dispersions

The dispersions of the invention can be prepared according to two methods.

In the first, a powder of a TFE/HFP copolymer, prepared according to the general method described in U.S. Pat. 2,946,763, is thoroughly mixed with an organic liquid having a surface tension below about 40 dynes per centimeter,[1] preferably 20–30 dynes per centimeter. The mixture is then ball-milled for about 2 hours to give a dispersion of the invention.

The ratio of copolymer powder to organic liquid will be dictated by the solids content required in the composition, which in turn will be dictated by its intended use. Generally, the dispersion will contain 1–50%, by weight, of solids.

Illustrative of organic liquids having the proper surface tension are aromatic hydrocarbons such as benzene and toluene, alcohols, ketones such as methyl isobutyl ketone, mineral spirits, naphtha and chlorinated hydrocarbons such as chloroform, carbon tetrachloride, trichloroethylene, perchloroethylene, and "Freon"®[2] fluorocarbons. Methyl isobutylketone is preferred.

In a variant of the first method, an auxiliary film-forming material, such as one of those described later, is dissolved in an organic liquid and the copolymer powder is added to this solution, which is then ball-milled to give a dispersion of the invention containing an auxiliary film-forming material.

In the second method, the dispersions of the invention are prepared from aqueous dispersions of the copolymers whose particles have an average particle radius of from about 0.01 to about 3 microns, with no more than 50% of these particles being larger than 3 microns in radius.[3] Such aqueous dispersions can in turn be prepared according to the methods disclosed in the previously mentioned Bro et al. patent, or can be obtained commercially.

The aqueous phase of this starting dispersion is displaced with an organic liquid phase. Any organic liquid can be used which has a surface tension of less than about 40 dynes per centimeter,[4] which forms a water/organic

---

[1] Measured at 25° C. by the du Nouy ring method, as described in American Society for Testing Materials, Method D 1331–56.
[2] Sold by E. I. du Pont de Nemours & Company.
[3] Measured by direct microscopic examination at a magnification of about 750 diameters. Particle dimensions can be measured by comparison with an eye-piece scale or by direct comparison with markings on a calibrated slide.
Particle size can also be measured by the angular dependent light scattering method described by Aughey et al. in J. Opt. Soc. Am., 44, 833 (1954).
Particles smaller than about 1.0 micron can be measured by electron microscopy.
[4] Measured at 25° C. by ASTM D 1331–56.

liquid azeotrope and which does not physically or chemically interfere with the copolymer dispersion. These organic liquids previously mentioned are suitable. Of those, toluene and methyl isobutyl ketone give the best results.

The organic liquid is mixed with up to 50% (by volume) of an aqueous TFE/HFP copolymer dispersion, preferably containing about 55% solids. Boiling is then begun and the water/organic liquid azeotrope is continuously distilled off. This azeotrope is collected, condensed, and the organic liquid phase is separated and returned to the vessel. Distillation is continued until the material remaining in the vessel is substantially anhydrous. "Substantially anhydrous," as it is used in this context, means less than about 1.0% (by weight) of water.

If the resulting product is slightly coagulated, it can be milled, preferably in a ball or pebble mill, for from 2–100 hours, the period depending on the degree of coagulation. As a general rule, 24 hours of milling is enough.

The dispersions prepared in this way contain discrete copolymer particles having an average radius of about 0.01 to about 3 microns, no more than 50% (by weight) of the particles having radii larger than 3 microns. Generally speaking, stability of the dispersions increases with decreasing particle size. Highly preferred dispersions therefore have particles whose average radius ranges from 0.01 to 0.9 micron.

The dispersions contain from about 1% to about 50%, by weight, of particulate copolymer. Dispersions preferred for their stability contain about 30–40%, by weight, of polymer. The dispersions will vary in viscosity according to their solids content and according to the organic liquids used, and can range from free-flowing to thixotropic viscid fluids.

The dispersions are highly stable. They can remain in storage for extended periods with no appreciable coagulation or changes in viscosity. If over a period of time slight settling should occur, the particles can be easily dispersed by agitating the dispersions briefly. In addition, the dispersions do not coagulate on heating, freezing agitation or on addition of salts, electrolytes or other miscible organic liquids.

The dispersions of the invention are suitable for direct use as coating compositions, but pigments otherwise suitable for use in organic coating compositions can be added if desirable. The compositions can be applied by such conventional methods as spraying, brushing, dipping or roller coating. They air-dry quickly, leaving behind powdery residues of particulate copolymer which give the coated articles lubricious surfaces. The dispersions are therefore highly useful as lubricating sprays for industrial and household purposes. Those dispersions in which the organic liquid is a "Freon"® fluorocarbon can be packaged in conventional aerosol spray cans.

Tough, permanent, continuous, lubricious films of TFE/HFP copolymers can be produced on any substrate capable of withstanding the heat treatment involved by applying a dispersion of the invention to the substrate and then heating it to a temperature of from 400–750° F. for 10–30 minutes. Such fused films are a boon on kitchen utensils and ice-cube trays, where they prevent sticking and caking. The films also have good electrical insulating properties.

Blending with other materials (Auxiliaries A)

Although these dispersions are entirely satisfactory as coating compositions in their own right, highly desirable balances of properties can be imparted to films derived from them by blending the dispersions with other film-forming materials.

For example, the toughness and durability of films containing particulate TFE/HFP copolymer, obtained when the dispersions are air-dried or baked at temperatures below the copolymer fusion point, can be improved by physically blending the dispersions with auxiliary materials which form films at these temperatures, such as drying oils, alkyd resins, polybutadiene, polyvinyl chloride, acrylic polymers and copolymers, nitrocellulose, urea-formaldehyde resins, polyurethanes, aliphatic and alicyclic polyamides, polycarbonates and vinyl cyclic acetals. Blends of these can also be used.

The auxiliary materials can be blended into the dispersions in concentrations ranging from about 5% to about 95%, by weight, of the total composition. The precise amount will naturally depend on the properties desired of the final product. They are ordinarily added to the copolymer dispersions as solutions in solvents miscible with the organic liquid used as a dispersion medium. The nature of the solvent is unimportant because the dispersions do not coagulate even when relatively large amounts of extraneous miscible organic liquids are added. It is important, however, that the amount of water added when such blends are made should not bring the total amount over the maximum limit of about 1.0%, by weight.

Blending with heat-stable materials (Auxiliaries B)

It has also been found that films containing fused copolymer, obtained when the dispersions are baked at temperatures above the TFE/HFP copolymer fusion point, can be given highly desirable properties by using the copolymer dispersions blended with other auxiliary film-forming materials which do not decompose at the temperature required for fusing the TFE/HFP copolymer, or by blending with precursors of these materials which become heat stable on heating. Blending with such materials makes possible the formation of films having degrees of adhesion, toughness, durability and lubricity which cannot be achieved using a TFE/HFP copolymer dispersion by itself.

For example, durable heat-stable films containing TFE/FP copolymer and a polyimide or a polyamide-imide can be made by using a dispersion of the invention blended with a corresponding polyamide acid or a polyamide acid amide, which forms a polyimide or a polyamide-imide at the TFE/HFP copolymer fusion temperature. Illustrative of the polyamide acids which can be used are those described in Edwards U.S. Pat. 3,179,614, which patent is incorporated into this specification only to disclose polyamide acids and how they are prepared. Preferred polyamide acids are those which form pyromellitic dianhydride/oxydianiline polyimides, benzophenone tetracarboxylic dianhydride/oxydianiline polyimides and benzophenone tetracarboxylic dianhydride/methylene dianiline polyimides.

Illustrative of the polyamide acid amides which can be used are those described in U.S. Pat. 3,260,691 to Lavin, et al., which patent is also incorporated into this specification only to disclose polyamide acid amides and how they are prepared. Polyamide acid amides preferred for the excellence of the films they give with dispersions of the invention are those derived from trimellitic anhydride and methylene dianiline, trimellitic anhydride and oxydianiline, and trimellitic anhydride and meta-phenylene diamine.

Other auxiliary materials which can be used are aromatic polyamides such as poly(m-phenylenediamine isophthalamide, polyoxadiazoles, polybenzimideazoles, polybenzothiazoles, polyphenylene ethers, silicones, phenol-formaldehyde resins, melamine-formaldehyde resins, benzoguanamine-formaldehyde resins, aromatic polyesters, polyvinyl fluoride, polyvinylidene fluoride, vinylidene fluoride/hexafluoropropylene copolymers such as those described in U.S. Pat. 3,051,677 and vinylidene fluoride/hexafluoropropylene/tetrafluoroethylene terpolymers such as those described in U.S. Pat. 2,968,649.

These heat-stable auxiliary materials are added to the copolymer dispersions either as true solutions or as organosols. As with the other auxiliary materials, the nature of the miscible solvent or organic liquid used is unimportant; it is necessary only that the maximum amount of water in the product be held below about 1% by weight.

The materials are added in concentrations of from about 10% to about 95% (by weight) of the total dispersion and are present in TFE/HFP copolymer/auxiliary material weight ratios of from 10/90 to 90/10. The polyamide acids and polyamide acid amides will preferably be present in weight ratios of from 30/70 to about 70/30. The vinylidene fluoride/hexafluoropropylene copolymers and the vinylidene fluoride/hexafluoropropylene/tetrafluoroethylene terpolymers will preferably be present in weight ratios of from about 50/50 to about 80/20.

Compositions containing the heat-stable auxiliary materials are conventionally applied and then fused, as already described. The properties of the resulting films vary with the nature of the auxiliary components used and their concentrations.

It is most surprising and completely contrary to what one might expect that such a film, containing either particulate or fused copolymer and the auxiliary material, is not uniform in composition throughout its thickness. Quite the other way around, that portion of film at the substrate-film interface is composed predominantly of the auxiliary material, while the other surface is predominantly fused or particulate TFE/HFP copolymer. The film is not stratified or laminar, the space between the interfaces being a blend (in the case of Auxiliary Marterials A) or a molecular entanglement (in the case of Auxiliary Materials B) of copolymer and auxiliary material, containing progressively more copolymer toward the film-air interface.

This non-uniform composition gives highly desirable properties to the film. Because the auxiliary material is predominant at the substrate-film interface, a highly tenacious bond between the substrate and the film can be provided. The predominancy of the TFE/HFP copolymer at the film-air interface gives the film an inert lubricious surface and also gives it outstanding release properties. Such a film has a fairly constant coefficient of friction, even when component ratios are varied greatly. This suggests that relatively expensive TFE/HFP copolymers can be blended with cheaper materials without sacrificing desirable properties.

This non-uniformity phenomenon makes these compositions useful in fabricating articles requiring durable, lubricious films permanently bonded to their substrates. Those containing Auxiliary Materials B are especially useful in coating such things as wire, metal foil, cooking utensils, boilers, pipes, ship bottoms, ice-cube trays, snow shovels and plows, industrial containers and molds where quick release is desirable. They are also particularly suited for coating cooking utensils because their films pick up less oil and grease than do conventional polytetrafluoroethylene coatings. These compositions are also useful as binding agents in the preparation of coated glass fabrics and laminates. Laminates made in this way have excellent interlaminar adhesion and are useful as electrical insulators.

The compositions containing Auxiliary Materials A are also useful for coating industrial containers and molds for quick release properties.

Dispersions of the invention containing polyamide acid amides, when fused, give finishes which are not only lubricious and well bonded to their substrates, but also highly resistant to abrasion and thermal degradation. Surprisingly, these properties remain fairly constant, even after several thousand abrasive strokes. This makes them useful in coating saw blades, drills, files, bearings, hinge pins, iron sole plates and the like.

Those dispersions containing the vinylidene fluoride/hexafluoropropylene copolymers and vinylidene fluoride/hexafluoropropylene/tetrafluoroethylene terpolymers give flexible finishes with excellent resistance to thermal degradation. This makes them useful as wire coatings.

DESCRIPTION OF THE PREFERRED EMBODIMENTS

The following examples are submitted so that the invention can be more easily understood and readily practiced. They are intended to be illustrative and show only the preferred embodiments of the invention. Those skilled in the art will no doubt be able to compose numerous variations on their central theme. It is fully intended that these variations be considered part of the basic inventive concept.

In the examples, all proportions are by weight unless otherwise indicated.

Example 1

A glass pot was charged with 1300 parts of toluene, which was then heated to 108° C., with slow stirring. At 108° C., the stirring rate was increased and 1000 parts of an aqueous dispersion of an 85/15 TFE/HFP copolymer, containing 52% solids and having an average particle radius of about 1 micron (with no particles larger than 3 microns radius), were added dropwise.

The pot temperature was maintained between 86–110° C. for about 4 hours. The water/toluene azeotrope was continuously removed and condensed. The toluene phase was separated and returned to the pot. After 480 parts of water had been collected, heating was discontinued and the batch was cooled to give about 1820 parts of a white thixotropic dispersion containing 28.6% solids.

This was ground with glass beads for 24 hours to give a highly stable dispersion containing TFE/HFP copolymer particles having an average radius of about 1 micron (with no particles larger than 3 microns radius). The water content of the dispersion, as determined by Karl Fisher Analysis, was found to be 0.0009–0.013%.

The dispersion can be stored for extended periods with no irreversible settling, and does not coagulate when heated, frozen or when miscible solvents are added.

The dispersion was brushed on an aluminum panel and allowed to air dry. The resulting powdery film gave the panel a lubricious finish.

Example 2

Five hundred parts of methyl isobutyl ketone were charged into a glass pot. The ketone was heated to 116° C. with mild agitation. At 116° C., the rate of stirring was increased and 500 parts of an aqueous dispersion of TFE/HFP copolymer like that described in Example 1, containing 53% solids, were added to the pot, dropwise, over a 1-hour period.

The pot temperature dropped to 89° C. in 15 minutes and remained there for 45 minutes more. The water/methyl isobutyl ketone azeotrope was continuously collected during this period. The methyl isobutyl ketone phase was separated and returned to the pot.

The final pot temperature was 116° C. The product, 780 parts, was a white thixotropic dispersion having a solids content of about 34.4%. The radii of the polymer particles, as determined by the light scattering method, ranged from 0.11–1.3 microns, the average being about 1.0 micron.

After being ground with glass beads for 2 hours, this dispersion had the same physical characteristics and properties as those described for the dispersion in Example 1. The water content was 0.05%.

Example 3

One thousand parts of dry 85/15 TFE/HFP copolymer powder, prepared according to the method described in column 4 of Bro U.S. Pat. 2,946,763, and 1500 parts of V, M and P naphtha were placed in a porcelain mill. 3500 parts of pebbles were added and the mixture was milled for 24 hours.

This mixture was then filtered to give a stable thixotropic dispersion (2027 parts) whose particles had radii in the range of 0.9–1.0 micron, the average being about 1 micron.

Example 4

Into a porcelain mill containing 1500 parts of pebbles were placed 425 parts of 85/15 TFE/HFP copolymer powder of Example 3 and 790 parts of methyl isobutyl ketone. This mixture was ground for 24 hours on a rolling mill. The mill contents were then filtered to give a unifrom stable copolymer dispersion containing 35% solids, whose particles had radii in the range 0.1–1.5 microns, the average being about 0.5 micron.

Example 5

A 75/25 TFE/HFP copolymer organosol can be prepared as in Example 4 by substituting 425 parts of a 75/25 TFE/HFP copolymer for the 85/15 copolymer.

Example 6

An alkyd resin solution was prepared by mixing:

|  | Parts |
|---|---|
| Glyceride phthalate resin modified with about 50% linseed oil, 50% concentration in a hydrocarbon solvent | 28 |
| Mineral spirits | 54 |
| Cobalt naphthenate dryer (6% cobalt) | 0.5 |

This solution was blended with 75 parts of the TFE/HFP copolymer dispersion of Example 1. The blend was sprayed on a steel panel and allowed to air dry overnight at room temperature. The resulting film was tough, non-wetting, with a low coefficient of friction.

The following film-forming materials, when dissolved in appropriate solvents and used in the same proportions as the alkyd resin and similarly processed, will give equivalent results:

Polyurethane resins
Polymethylmethacrylate
Nitrocellulose
Polyvinyl chloride

Example 7

Into a pebble mill one-half filled with pebbles were charged:

|  | Parts |
|---|---|
| TFE/HFP 85/15 copolymer (as described in Example 1) | 396 |
| Polyurethane resin solution (71.5% solution in xylene of a polyurethane prepared from polypropylene glycol, trimethylpropane and toluene-2,4-diisocyanate) | 1308 |
| Methyl isobutyl ketone | 852 |

This charge was milled for about 16 hours to give a dispersion containing about 51.8% solids.

The dispersion was sprayed over the clean inside surface of a railroad hopper car to a thickness of about 2 mils (dry). This coating dried to the touch in about four hours to give a durable lubricious film which aided in releasing the contents of the car.

The 85/15 copolymer can be replaced with an equivalent amount of a 75/25 or 95/5 copolymer with substantially the same results.

Example 8

A polyamide acid solution, made by reacting benzophenone tetracarboxylic dianhydride and p,p′-methylene dianiline in N-methylpyrrolidone, containing 19.1% solids, was charged into a glass container.

An anhydrous 85/15 TFE/HFP copolymer dispersion containing 35% solids and having an average particle radius of about 1 micron, prepared as in Example 1, was then blended with the amide acid solution in the various weight proportions listed in the table which follows.

The two components were mixed thoroughly and the resulting stable dispersion were applied to aluminum panels by doctor blading. These films were baked at 650° F. for 30 minutes. The compositions and the films are described below:

| Composition copolymer/ polymide | Dispersion/ solution parts charged | Contact angles (water) of film, deg. | Coefficient of friction of film |
|---|---|---|---|
| 100/0 |  | 109 | 0.06–0.1 |
| 75/25 | 214/131.5 | 109 | 0.06–0.1 |
| 50/50 | 142.8/263 | 109 | 0.06–0.1 |
| 25/75 | 71.4/394.5 | 109 | 0.03–0.1 |
| 0/100 |  | 67 | 0.18–0.19 |

The coefficients of friction of compositions ranging from 100% TFE/HFP copolymer to a 25/75 blend remain constant, as do their contact angles. This shows that the air-film interface is predominantly TFE/HFP copolymer. All films containing polyimide showed good adhesion to the panels.

Example 9

Twenty parts of a 5% solution of poly(m-phenylenediamine isophthalamide) in dimethylacetamide were placed in a glass vessel. Two parts of the TFE/HFP dispersion of Example 1 were added to this solution and blended thoroughly.

The resulting dispersion was sprayed on an aluminum ice-cube tray and baked at 600° F. for 30 minutes to give a film about 0.1 mil thick. The film was highly non-wetting and adhered tenaciously to the tray. Ice cubes were released easily from the tray, with no sticking.

Example 10

A glass vessel was charged with 5 parts of a nonionic surfactant; 95 parts of a 52.7% solution, in N-methyl pyrrolidone, of 27.5 parts of the dibutyl ester of benzophenone tetracarboxylic acid dianhydride and 22.5 parts of p,p′-methylene dianiline; 89 parts of butyl alcohol; and 149 parts of the dispersion prepared in Example 2. These components were thoroughly blended to give a homogeneous dispersion containing 29.5% solids.

This dispersion was diluted to 27.3% solids with butyl alcohol and sprayed on a panel of auto body steel, to give a wet film about 1.5 mils thick. This film was then flashed for 15 minutes at 510° F. and baked for 30 minutes at 650° F. The resulting film had a Knoop hardness of 9.5 and a coefficient of friction of 0.067.

Example 11

A glass vessel was charged with 5 parts of a nonionic surfactant, 111 parts of a 45% solids dispersion of polyvinylidene fluoride in a 50/50 mixture of diisobutyl ketone and dimethyl phthalate, and 73 parts of butyl alcohol. The mixture was thoroughly blended and 149 parts of the TFE/HFP dispersion of Example 1 were then added.

The resulting milky white dispersion was then reduced to 20% solids by adding 162 parts of diisobutyl ketone. This diluted dispersion was sprayed on an aluminum panel and baked at 550° F. for 30 minutes. The resulting film, 0.5 mil thick, showed good non-wetting properties and had a coefficient of friction of 0.9–1.10.

Example 12

Seventy-four parts of the dispersion of Example 2 were blended with 430 parts of a 17.5% solution of the polyamide acid derived from pyromellitic dianhydride and 4,4′-oxydianiline in an 80/20 mixture of N-methyl pyrrolidone and an aromatic hydrocarbon having a boiling point of 150–190° C. This blend was placed in a glass jar, which was then rolled for 72 hours.

The resulting stable dispersion containing 19.8% solids was coated on No. 18 copper wire by die application in a conventional wire coating machine. The wire was then baked in a 21-foot vertical oven. The wire speed ranged from 20 to 30 feet per minute. The oven temperature at the point where the wire entered was 235° F., and the oven temperature at the exit end was 725° F. As the wire emerged from the oven, it was cooled at room temperature and then rolled into coils. The coating increased the diameter of the wire by 2.9 mils. The wire showed a high degree of abrasion resistance, was lubricious and flexible and had high dielectric strength and high corona resistance.

Example 13

Into a pebble mill half-filled with pebbles were charged:

| | Parts |
|---|---|
| 85/15 TFE/HFP copolymer (as described in Ex. 3) | 352 |
| Epon 1007 [1] | 750 |
| Methyl isobutyl ketone | 556 |
| Butyl carbitol | 41.6 |
| Diisobutyl ketone | 61.6 |

[1] An epoxy resin sold by Shell Chemical Co., having a melting point of 127–133° C. and an epoxide equivalent of 2000–2500. It is a reaction product of epichlorohydrin and bisphenol A.

This charge was ground for 24 hours. The resulting dispersion was then filtered through a paint strainer.

To this dispersion were then added 26 parts of a 66% solution of benzoguanamine-formaldehyde resin in butyl alcohol. The mixture was stirred for one hour and once again filtered through a paint strainer. The resulting dispersion had a solids content of 36%.

This dispersion was sprayed on a steel panel, allowed to air dry and was then baked for 15 minutes at 600° F. The resulting film showed excellent adhesion to the metal, had a Knoop hardness of 9–10, a kinetic coefficient of friction of 0106–.015 and a contact angle (water) of 105° C. The air-film interface was predominantly substantially pure TFE/HFP copolymer.

Example 14

Into a pebble mill half filled with pebbles were charged:

| | Parts |
|---|---|
| 75/25 TFE/HFP copolymer powder (average particle diameter, 1–3 microns) | 100 |
| Methyl isobutyl ketone | 100 |
| Epon 1007 (40% solution in methyl isobutyl ketone) | 176 |
| Benzoguanamine-formaldehyde resin (66% in butanol) | 46 |
| $TiO_2$ | 16 |
| Cobalt blue | 3 |

This charge is milled for about 24 hours, filtered through a paint strainer, sprayed on the metal blade of a snow shovel to a dry film thickness of about 1 mil, and then baked at 450° F. for 15 minutes. The resulting film was predominantly TFE/HFP copolymer at the air-film interface. Its lubricity prevented snow from sticking to it.

Example 15

To a pebble mill containing about 1500 parts of pebbles were charged:

| | Parts |
|---|---|
| Polyamide acid amide solution [1] | 1500 |
| 85/15 TFE/HFP copolymer powder (average particle diameter 1–3 microns) | 345 |
| Cobalt blue | 69 |
| Methyl isobutyl ketone | 186 |

[1] A 23% solution of the reaction product of trimellitic anhydride and methylene dianiline in N-methyl pyrrolidone. The reaction product is sold by the American Oil Co. as Amoco AI-10 resin.

This charge was milled for 24 hours, filtered through a paint strainer and then reduced with a 50/50 mixture of N-methyl pyrrolidone and methyl isobutyl ketone to a total solids content of 23%.

The resulting solution was sprayed to the surface of a circular saw blade, baked for 15 minutes at 300° F. and then baked again for 15 minutes at 600° F. to give a durable, abrasion-resistant lubricious film.

Example 16

To 1645 parts of the organosol prepared in Example 4, were added 1624 parts of a 15% solution of a 60/40 vinylidene fluoride/hexafluoropropylene copolymer in a 50/50 mixture of methyl isobutyl ketone and butyl carbitol.

The mixture was stirred for 1 hour, filtered and then coated on No. 18 copper wire in the wire coating machine described in Example 12. The wire was then baked and cooled as in Example 12. The resulting coating was about 6 mils thick.

This coating could be easily stripped from the wire and yet showed twice the cut-through resistance of wire coated with a standard polytetrafluoroethylene coating.

Vinylidene fluoride/hexafluoropropylene/tetrafluoroethylene terpolymers can be substituted for the vinylidene fluoride/hexafluoropropylene copolymer, in the same amount, to give coatings that have substantially the same properties.

Example 17

Into a pebble mill half-filled with pebbles were charged:

| | Parts |
|---|---|
| TFE/HFP 95/5 copolymer powder (average particle diameter 1–3 microns) | 41 |
| Polyamide acid derived from pyromellitic dianhydride and oxydianiline (16.5% solution in N-methylpyrrolidone) | 242 |
| Carbon black | 8 |
| Methyl isobutyl ketone | 200 |
| N-methylpyrrolidone | 190 |

This charge was ground for 24 hours, filtered through a paint strainer and sprayed on an iron sole plate. The plate was baked at 300° F. for 30 minutes and then at 750° F. for 15 minutes.

The resulting film showed excellent adhesion to the sole plate and had an inert lubricious finish.

Example 18

A composition was prepared by mixing the following:

| | Parts |
|---|---|
| 85/15 TFE/HFP copolymer powder (average particle diameter 1–3 microns) | 14.9 |
| Methyl isobutyl ketone | 17.4 |
| $TiO_2$ | 2.7 |
| Red $Fe_2O_3$ | 0.7 |
| Carbon black | 0.007 |
| $Cr_2O_3$ | 0.007 |
| Butyl Carbitol | 5.2 |

To this composition were then added a solution of 10.4 parts of Epon 1007 in 7.8 parts of xylene and 7.8 parts of diacetone alcohol. This mixture was then pebble milled for 16 hours.

To the resulting mill base were then added (1) a solution of 1.23 parts of silicone resin [5] in 0.8 part of xylene, (2) a solution of 1.25 parts of silicone resin [6] in 1.25 parts of xylene, and (3) a solution of 1.3 parts of benzoguanamine-formaldehyde resin in 0.67 part of butanol.

The composition was then thoroughly mixed and sprayed on a steel snow-shovel blade to a thickness of 1 mil (dry). The blade was then baked at 600° F. for 15 minutes.

The resulting film gave the blade a lubricious surface which prevented snow from sticking to it.

---

[5] Sold by Dow-Corning Corp. as Silicone Resin DC–801.
[6] Sold by Dow-Corning Corp. as Silicone Resin DC–803.

Example 19

Four mill bases were prepared according to the following formulas:

(1)

| | Parts |
|---|---|
| Silicone resin 806A [1] | 6.2 |
| 85/15 TFE/HFP copolymer powder (average particle diameter, 1–3 microns) | 4.8 |
| Epon 828 [2] | 0.7 |
| Melamine-formaldehyde resin | 0.33 |
| $Fe_2O_3$ | 0.88 |
| Butyl carbitol | 9.1 |
| Methyl isobutyl ketone | 6.5 |

[1] Sold by Dow-Corning Co.
[2] Sold by Shell Chemical Co. A normally liquid epoxy resin having an epoxide equivalent of 180–195.

(2)

| | Parts |
|---|---|
| 85/15 TFE/HFP copolymer powder | 1.9 |
| Silicone resin 806A | 2.4 |
| Epon 828 | 0.28 |
| Melmaine-formaldehyde resin | 0.13 |
| $Fe_2O_3$ | 0.38 |
| Butyl Carbitol | 3.6 |
| Methyl isobutyl ketone | 2.55 |

(3)

| | Parts |
|---|---|
| 85/15 TFE/HFP copolymer powder | 0.15 |
| Silicone resin 806A | 0.2 |
| Epon 828 | 0.02 |
| Melamine-formaldehyde resin | 0.01 |
| Carbon black | 0.03 |
| Butyl Carbitol | 0.28 |
| Methyl isobutyl ketone | 0.2 |

(4)

| | Parts |
|---|---|
| 85/15 TFE/HFP copolymer powder | 10.06 |
| Silicone resin 806A | 12.9 |
| Epon 828 | 1.5 |
| Melamine-formaldehyde resin | 0.7 |
| $TiO_2$ | 1.8 |
| Butyl Carbitol | 19.0 |
| Methyl isobutyl ketone | 13.5 |

These mill bases were prepared by separately pebble milling each formulation for about 16 hours.

A coating composition was then prepared by mixing these mill bases.

This composition was then sprayed on a steel muffin tin to a thickness of 1 mil (dry). The tin was baked for 15 minutes at 300° F. and then for 15 minutes at 650° F. to give a smooth, lubricious surface which aided in releasing muffins from the tin after they had been baked.

Example 20

Three mill bases were prepared according to the following formulas:

(1)

| | Parts |
|---|---|
| 85/15 TFE/HFP copolymer powder (average particle diameter, 1–3 microns) | 4.7 |
| $TiO_2$ | 1.0 |
| Methyl isobutyl ketone | 13.2 |

(2)

| | Parts |
|---|---|
| 85/15 TFE/HFP copolymer powder | 4.7 |
| Brown $Fe_2O_3$ | 1.0 |
| Methyl isobutyl ketone | 13.2 |

(3)

| | Parts |
|---|---|
| 85/15 TFE/HFP copolymer powder | 1.0 |
| Red $Fe_2O_3$ | 0.2 |
| Methyl isobutyl ketone | 2.9 |

These mill bases were prepared by separately pebble milling each formulation for about 16 hours.

A coating composition was then prepared by mixing the mill bases and adding to the mixture a solution of 10.5 grams of AI–10 resin in 47 parts of N-methyl pyrrolidone.

This composition was sprayed on a power saw blade to a thickness of 1 mil (dry) and baked for 15 minutes at 400° F., then 30 minutes at 550° F. to give a durable, abrasion resistant, lubricious film.

Example 21

Four mill bases were prepared according to the following formulas:

(1)

| | Parts |
|---|---|
| 85/15 TFE/HFP copolymer powder (average particle diameter, 1–3 microns) | 6.23 |
| $TiO_2$ | 1.29 |
| Methyl isobutyl ketone | 17.4 |

(2)

| | Parts |
|---|---|
| 85/15 TFE/HFP copolymer powder | 2.9 |
| Brown $Fe_2O_3$ | 0.6 |
| Methyl isobutyl ketone | 8.2 |

(3)

| | Parts |
|---|---|
| 85/15 TFE/HFP copolymer powder | 1.96 |
| Red $Fe_2O_3$ | 0.4 |
| Methyl isobutyl ketone | 5.5 |

(4)

| | Parts |
|---|---|
| 85/15 TFE/HFP copolymer powder | 0.8 |
| Carbon black | 0.08 |
| Methyl isobutyl ketone | 2.3 |

These mill bases were prepared by separately pebble milling each formulation for about 16 hours.

A coating composition was then prepared by mixing the mill bases and adding to the mixture a solution of 9.4 parts of AI–10 resin in 42.4 parts of N-methyl pyrrolidone.

This composition was sprayed on a cake pan to a thickness of about 1 mil (dry) and baked for 15 minutes at 300° F., then 15 minutes at 650° F., to give a durable, lubricious film which aided in releasing the cake from the pan after baking.

Example 22

To a porcelain mill two-thirds full of pebbles were charged:

| | Parts |
|---|---|
| 75/25 TFE/HFP copolymer powder (average particle diameter, 1–3 microns) | 12.2 |
| Methyl isobutyl ketone | 23.7 |
| Butyl Carbitol | 11.8 |

This charge was milled for about 16 hours, and to the resulting dispersion were then added

| | Parts |
|---|---|
| Butyrolactone | 7.9 |
| 3-($\beta$ - methacryloxyethyl)-2,2-spirocyclohexyl oxazolidine | 8.1 |
| Hydrocarbon solvent (189–219° C.) | 10.12 |
| Isophorone | 9.0 |
| Polyvinylidene fluoride powder | 16.0 |
| Microcrystalline wax | 0.2 |
| Thermolite (organotin stabilizer) | 0.1 |

These components were mixed and applied to No. 18 copper wire previously coated with polytetrafluoroethylene to give an insulation layer with excellent abrasion resistance.

Example 23

To a porcelain pebble mill were charged:

| | Parts |
|---|---|
| 75/25 TFE/HFP copolymer powder (average particle diameter, 1–3 microns) | 10.5 |
| Cobalt blue | 1.5 |
| Lamp black | 0.5 |
| $TiO_2$ | 0.13 |
| Monastral blue | 0.03 |
| Methyl isobutyl ketone | 29.2 |

This charge was milled for about 16 hours and to it was then added a solution of 10.5 parts of Al–10 resin in 47.1 parts of N-methylpyrrolidone.

This composition was mixed thoroughly and applied to a power saw blade as in Example 20, with substantially the same results.

Example 24

Two mill bases were prepared according to the following formulas:

(1)

| | Parts |
|---|---|
| Polyamide acid of Example 12 | 3.6 |
| Carbon black | 0.6 |
| Methyl isobutyl ketone | 1.7 |
| N-methyl pyrrolidone | 1.7 |

(2)

| | Parts |
|---|---|
| 95/5 TFE/HFP copolymer powder (average particle diameter, 1–3 microns) | 11.9 |
| Tertiary butanol | 11.9 |
| Methyl isobutyl ketone | 10.0 |
| N-methyl pyrrolidone | 25.2 |

These compositions were separately milled for about 16 hours, thoroughly mixed, sprayed on an unprimed aluminum frypan to a thickness of about 1 mil (dry) and baked for 15 minutes at 300° F. and then 15 minutes at 750° F.

This pan was then top-coated with a conventional polytetrafluoroethylene enamel and baked for 15 minutes at 750° F. The PTFE top-coat adhered well to the frypan even after long use.

I claim:

1. A substantially anhydrous dispersion, in an organic liquid having a surface tension below about 40 dynes per centimeter, measured at 25° C., of from 1% to about 50%, by weight, of particles of a tetrafluoroethylene/hexafluoropropylene copolymer whose respective monomer unit weight ratios are 5–95/5–95 and whose molecular weight is greater than about 20,000, said copolymer particles having an average radius of from about .01 to about 3 microns, no more than 50% (by weight) of the particles having radii larger than about 3 microns, said dispersion also containing from about 5% to about 95%, by weight, of at least one auxiliary film-forming material.

2. The dispersion of claim 1 wherein the auxiliary film forming material(s) forms a film at a temperature below the copolymer fusion point.

3. The dispersion of claim 2 wherein the copolymer tetrafluoroethylene/hexafluoropropylene weight ratio is about 84–88/12–16.

4. The dispersion of claim 2 wherein the copolymer tetrafluoroethylene/hexafluoropropylene weight ratio is about 75–80/20–25.

5. The dispersion of claim 2 wherein the copolymer tetrafluoroethylene/hexafluoropropylene weight ratio is about 93–95/5–7.

6. The dispersion of claim 2 wherein the auxiliary material is a polyurethane.

7. The dispersion of claim 3 wherein the auxiliary material is a polyurethane.

8. The dispersion of claim 4 wherein the auxiliary material is a polyurethane.

9. The dispersion of claim 5 wherein the auxiliary material is a polyurethane.

10. The dispersion of claim 6 wherein the organic liquid is methyl isobutyl ketone.

11. The dispersion of claim 7 wherein the organic liquid is methyl isobutyl ketone.

12. The dispersion of claim 8 wherein the organic liquid is methyl isobutyl ketone.

13. The dispersion of claim 9 wherein the organic liquid is methyl isobutyl ketone.

14. The dispersion of claim 1 wherein the auxiliary film-forming material(s) does not decompose at the copolymer fusion point.

15. The dispersion of claim 14 wherein the copolymer tetrafluoroethylene/hexafluoropropylene weight ratio is about 84–88/12–16.

16. The dispersion of claim 14 wherein the copolymer tetrafluoroethylene/hexafluoropropylene weight ratio is about 75–80/20–25.

17. The dispersion of claim 14 wherein the copolymer tetrafluoroethylene/hexafluoropropylene weight ratio is about 93–95/5–7.

18. The dispersion of claim 14 wherein at least one of the auxiliary materials is a polyimide precursor.

19. The dispersion of claim 18 wherein the polyimide precursor is a polyamide acid represented by the formula

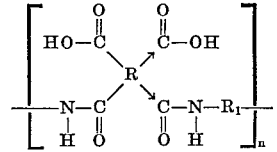

where

→ denotes isomerism;

R is a tetravalent organic radical containing at least 2 carbon atoms, no more than 2 carbonyl groups of each polyamide-acid unit being attached to any one carbon atom of said tetravalent radical;

$R_1$ is a divalent radical containing at least two carbon atoms, the amide groups of adjacent polyamide-acid units each attached to separate carbon atoms of said divalent radical; and n is a number great enough to give the polyamide acid an inherent viscosity of at least 0.1.

20. The dispersion of claim 14 wherein at least one of the auxiliary materials is a polyamide-imide precursor.

21. The dispersion of claim 20 wherein the polyamide-imide precursor is a polyamide acid amide derived from a compound represented by the formula

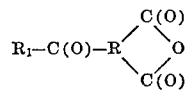

where

R is a trivalent aromatic radical and $R_1$ is —OH or a monovalent halogen atom; and a compound represented by the formula $$H_2N—R—NH_2$$

where

R is a divalent aromatic radical.

22. The dispersion of claim 21 wherein the auxiliary material comprises a reaction product of trimellitic dianhydride and methylene dianiline.

23. The dispersion of claim 14 wherein at least one of the auxiliary materials is an epoxy resin.

24. The dispersion of claim 14 wherein at least one of the auxiliary materials is a polyorganosiloxane.

25. The dispersion of claim 14 wherein at least one of the auxiliary materials is a benzoguanamine-formaldehyde resin.

26. The dispersion of claim 14 wherein at least one of the auxiliary materials is a melamine-formaldehyde resin.

27. The dispersion of claim 14 wherein at least one of the auxiliary materials is a polyvinylidene fluoride.

28. The dispersion of claim 14 wherein at least one of the auxiliary materials is a vinylidene fluoride/hexafluoropropylene copolymer.

29. The dispersion of claim 15 wherein the auxiliary materials comprise
(A) at least one polyorganosiloxane,
(B) an epoxy resin, and
(C) a benzoguanamine-formaldehyde resin.

30. The dispersion of claim 15 wherein the auxiliary materials comprise
(A) a polyorganosiloxane,
(B) an epoxy resin, and
(C) a melamine-formaldehyde resin.

31. The dispersion of claim 16 wherein the auxiliary material comprises
(A) an epoxy resin, and
(B) a benzoguanamine-formaldehyde resin.

32. The dispersion of claim 15 wherein the auxiliary material comprises the reaction product of trimellitic anhydride and methylene dianiline.

References Cited

UNITED STATES PATENTS

| | | | |
|---|---|---|---|
| 2,777,783 | 1/1957 | Welch | 260—33.6 F |
| 2,946,763 | 7/1960 | Bro et al. | 260—POLY F DIG |
| 3,312,651 | 4/1967 | Daniels et al. | 260—33.4 F |
| 3,356,759 | 12/1967 | Gerow | 260—857 |

ALLAN LIEBERMAN, Primary Examiner

U.S. Cl. X.R.

260—30.2, 31.8 F, 32.6 N, 32.8 N, 32.8 EP, 33.2 R, 33.4 F, 33.6 F, 34.2